United States Patent
Soskov et al.

(10) Patent No.: US 6,633,680 B2
(45) Date of Patent: Oct. 14, 2003

(54) SYSTEM, METHOD AND COMPUTER PROGRAM PRODUCT FOR SMALL-FONT COMPRESSION

(75) Inventors: Vladimir S. Soskov, Castro Valley, CA (US); Syed A. Azam, Union City, CA (US)

(73) Assignee: Morisawa & Co., Ltd., Osaka (JP)

( * ) Notice: Subject to any disclaimer, the term of this patent is extended or adjusted under 35 U.S.C. 154(b) by 0 days.

(21) Appl. No.: 09/952,912

(22) Filed: Sep. 14, 2001

(65) Prior Publication Data

US 2002/0173947 A1 Nov. 21, 2002

Related U.S. Application Data

(63) Continuation-in-part of application No. 09/802,477, filed on Mar. 9, 2001.

(51) Int. Cl.[7] .............................. G06K 9/36; G06K 9/46
(52) U.S. Cl. ...................... 382/242; 382/243; 382/239
(58) Field of Search ................................. 382/197–199, 382/202–203, 232, 241–243, 298–308, 309–310, 239; 345/441–442, 467–469, 660, 947; 358/426.12

(56) References Cited

U.S. PATENT DOCUMENTS 5,710,880 A * 1/1998 Howlett et al. ............. 345/468
5,857,067 A * 1/1999 Hassett et al. ........... 345/469.1

* cited by examiner

Primary Examiner—Timothy M. Johnson
(74) Attorney, Agent, or Firm—Silicon Valley IP Group; Kevin J. Zilka

(57) ABSTRACT

A system, method and computer program product are provided for the compression of characters with a predetermined size. Initially, a plurality of characters are received. Thereafter, the characters are compressed. Information is stored with the compression. Such information is capable of being used to modify the characters upon the characters being displayed with a predetermined size.

17 Claims, 7 Drawing Sheets

SYSTEM, METHOD AND COMPUTER PROGRAM PRODUCT FOR SMALL-FONT COMPRESSION

RELATED APPLICATION(S)

This application is a continuation-in-part of a parent application filed Mar. 9, 2001 under Ser. No. 09/802,477.

FIELD OF THE INVENTION

The present invention relates to compression algorithms, and more particularly to compressing textual data for storage and/or transmission utilizing a network.

BACKGROUND OF THE INVENTION

It is well known that an amount of dot data which is obtained by dividing image data of a character or the like into dots is extremely large. Therefore, in order to compress such a large quantity of data and then store or transmit the compressed data, various kinds of data compressing methods have been proposed. For example, the shape of a character or the like may be detected as a contour and contour information may be stored, thereby compressing the data amount.

For example, there are known: a straight line approximating method disclosed in Japanese Patent Laid-Open Applications Nos. 149522/1979 and 79154/1980; an n-degree curve approximating method disclosed in Japanese Patent Laid-open Nos. 39963/1982, 134745/1983, and 75976/1985; and the like.

Another approach is to convert the originally-scanned quantized data into a connected set of mathematically-defined boundaries of two-dimensional regions representing the "inside" or "outside" of a character. The boundaries are comprised of "curve elements" which, in the most primitive implementations, are simple line segments.

More sophisticated systems use more complex shapes such as quadratic or cubic Bezier curves. All of these systems have the objective of storage of these mathematical shapes, and reconstruction of the digital representations of the characters through properly constructed physical mechanisms or computer instructions.

A major benefit to the mathematical description is the ability to render output characters at any size by scaling the coordinate information stored in the character data descriptions, thereby eliminating the need for storage of bitmap data at every desired point size and/or output resolution. An added benefit of a mathematical description is the ability to subdivide the original outline into as many "curve elements" as necessary and to store the data representing them at whatever precision is required for replication of an original "master" design to the degree permitted by the scanning resolution.

Outline fonts are thus created by storing the outline of a character as a series of mathematical curves. This allows one to draw the character at any size with no additional information. However, one problem with outline fonts is that, at small sizes, they may become unreadable.

There is therefore a need for improved techniques for compressing fonts of a smaller size.

DISCLOSURE OF THE INVENTION

A system, method and computer program product are provided for the compression of characters with a predetermined size. Initially, a plurality of characters are received. Thereafter, the characters are compressed. Information is stored with the compression. Such information is capable of being used to modify the characters upon the characters being displayed with a predetermined size.

In one embodiment of the present invention, an outline of the characters is compressed. In use, the information modifies the characters for increasing the accuracy thereof when the characters are displayed with a smaller font size.

In another embodiment of the present invention, the information may include correction information capable of being used to correct the characters upon being displayed with the predetermined size. For example, the information may include position data, type data, and parameters data. Such information may further include point data, horizontal line data, vertical line data, move data, and bit map data.

An amount of the information may be a function of a size of the characters. In one embodiment, more information may be stored for characters of a smaller size. Moreover, the information may be capable of being used to modify the characters upon the occurrence of a special case when the characters are displayed with the predetermined size.

As an option, the information may be capable of being characterized in at least two different ways using the aforementioned data. As such, the appropriate way to characterize the information may be selected based on a size thereof.

DESCRIPTION OF THE PREFERRED EMBODIMENTS

Figure 1:
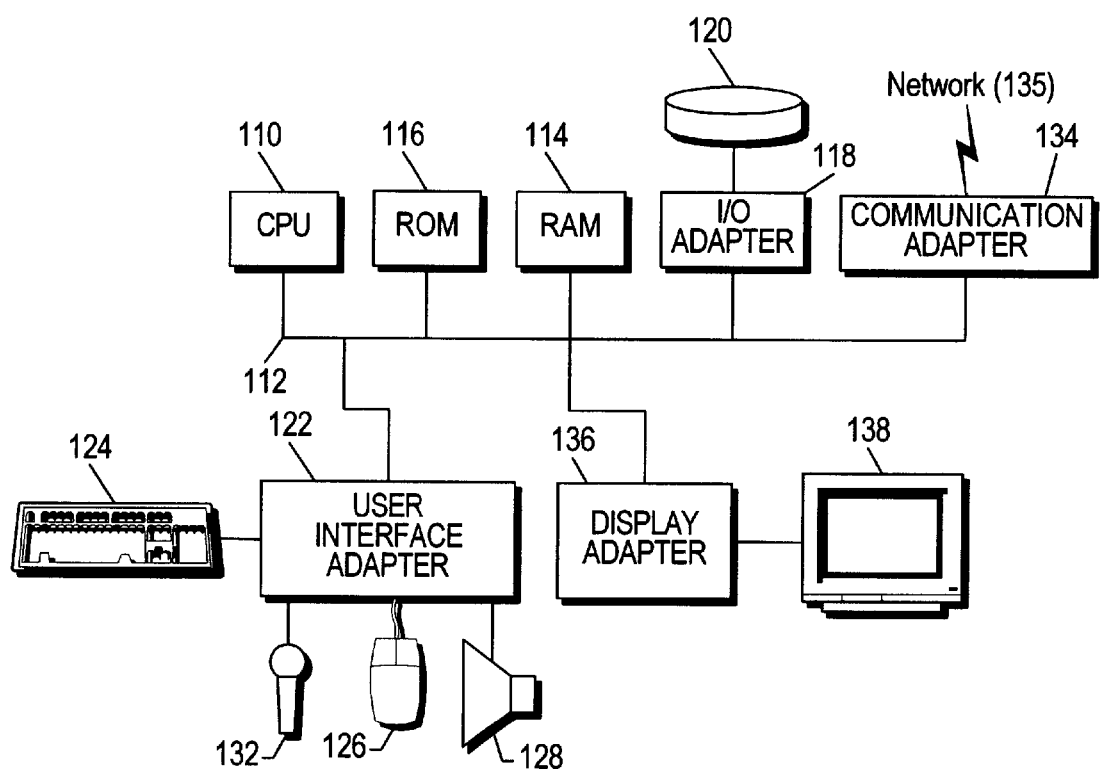
FIG. 1 shows a representative hardware environment in which the present invention may be carried out.

FIG. 1 shows a representative hardware environment in which the various methods of the present invention may be carried out. Such figure illustrates a typical hardware configuration of a workstation in accordance with a preferred embodiment having a central processing unit 110, such as a microprocessor, and a number of other units interconnected via a system bus 112.

The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network 135 (e.g., a data processing network) and a display adapter 136 for connecting the bus 112 to a display device 138.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 1A:
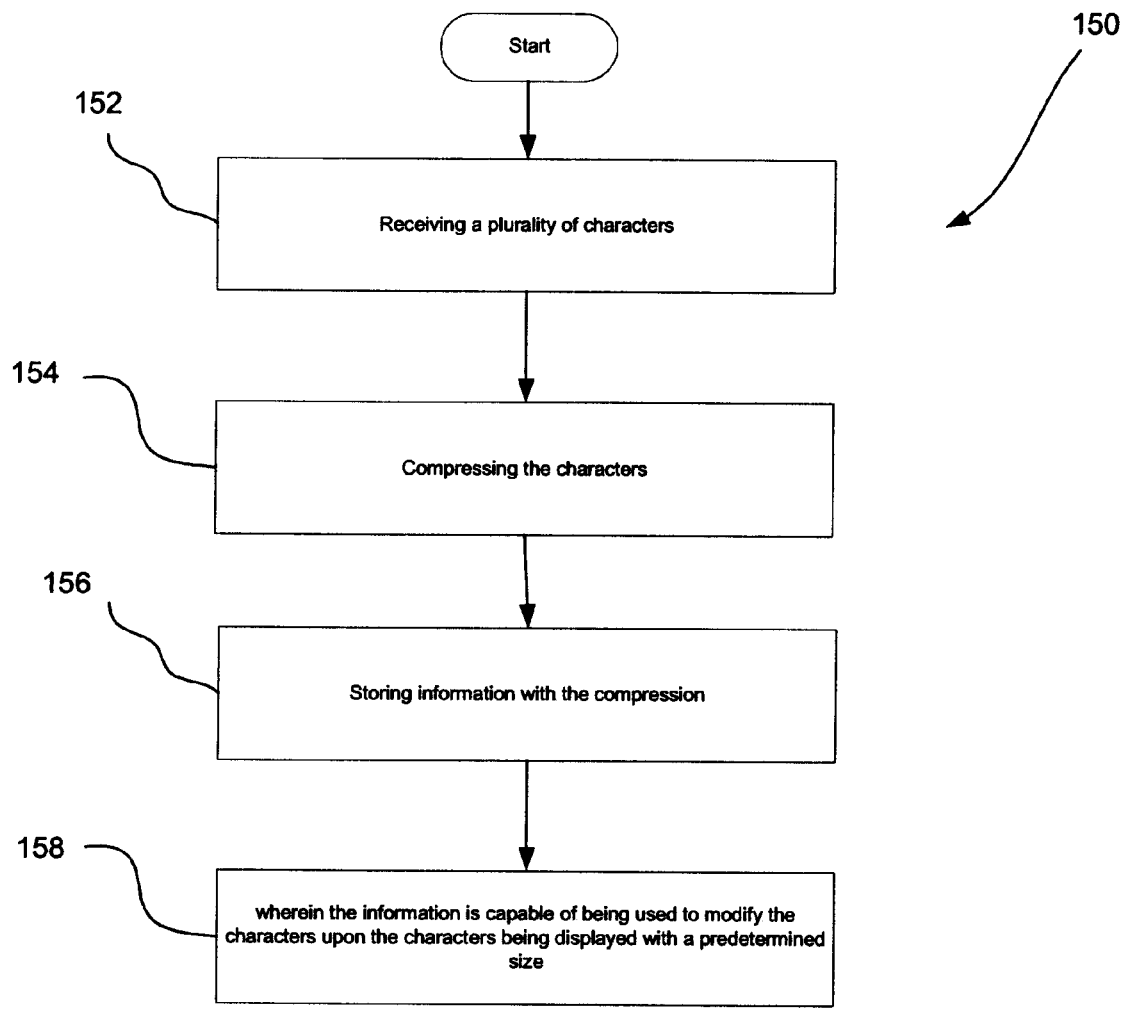
FIG. 1A illustrates a method for the compression of characters with a predetermined size.

FIG. 1A illustrates a method 150 for the compression of characters with a predetermined size. Initially, in operation 152, a plurality of characters are received. Such characters may take any form including, but not limited to any alpha, numeric, foreign, punctuation, symbol, or any other type of glyph.

Thereafter, in operation 154, the characters are compressed. In one embodiment of the present invention, an outline of the characters are compressed for efficiency purposes. It should be noted, however, that such compression may be accomplished in any desired manner for reducing a size of the characters for efficient storage, network transmission, etc. One exemplary font outline compression scheme will be set forth hereinafter starting with reference to FIG. 2.

Information is then stored with the compression, as indicated in operation 156. Such information is capable of being used to modify the characters upon the characters being displayed with a predetermined size, i.e. smaller size. Note operation 158. In one embodiment, such "hinting" information modifies, or corrects, the characters for increasing the accuracy of the characters when the characters are displayed with a smaller font size.

Figure 1B:
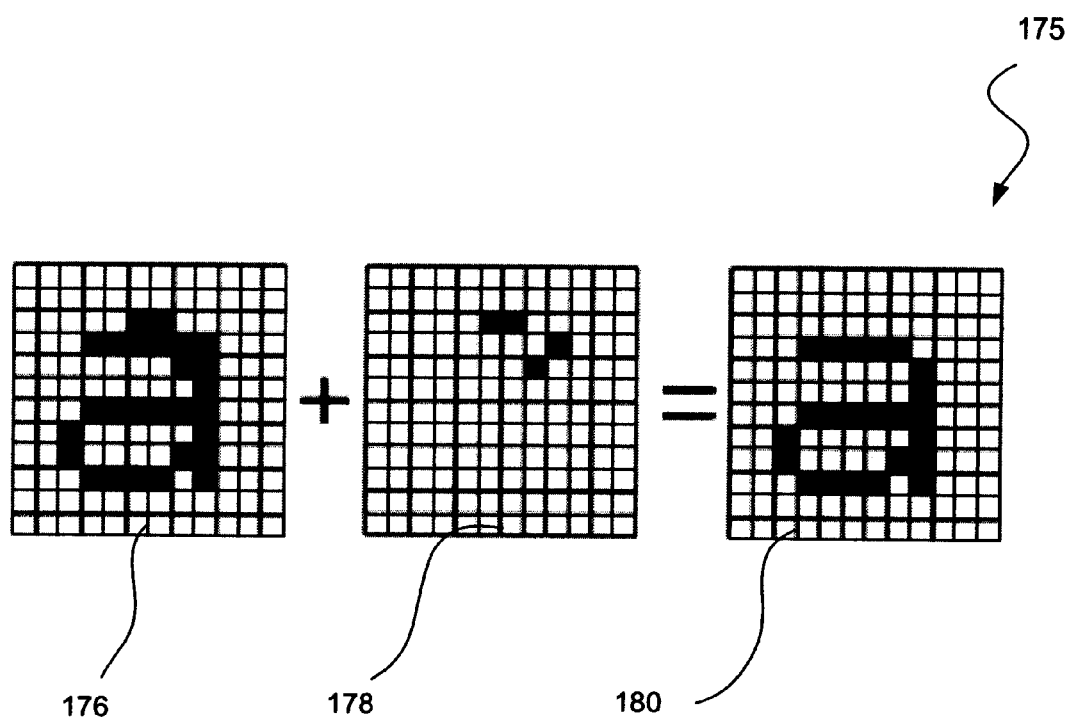
FIG. 1B illustrates one exemplary scheme for storing compression correction information, in accordance with one embodiment of the present invention.

FIG. 1B illustrates one exemplary scheme 175 for storing information in accordance with one embodiment of the present invention. As shown, the information may include correction information capable of being used to correct the characters upon being displayed with the small predetermined size. This is accomplished by receiving an initial character 176, and storing information required to make corrections 178 in order to render a more accurate image 180 of the character.

The character 176 of FIG. 1B is an "un-hinted" rasterized bitmap, and contains some pixels that are set wrong. The corrections 178 are stored as information with the compressed character. This is accomplished by changing the pixels at certain locations from "on" to "off," or "off" to "on." It should be noted that such information may be created either automatically or manually, per the desires of the user. The final image 180 is the completed bitmap.

In one embodiment, re-occurring information may be capable of being used to modify the initial character 176 upon the occurrence of a special case that often happens. For example, an initial character, "a," 176 often has additional portions which may be discarded when the initial character "a" is being displayed with a smaller font size.

While the corrections 178 are displayed as a bitmap in FIG. 1B, it should be noted that position data, type data, and optional parameter data may be stored to represent such corrections 178. Table 1 illustrates exemplary kinds of data and associated parameters that may be used, in accordance with one embodiment.

TABLE 1

Point data: (x, y) location, no parameters
Horizontal line data: (x, y) location of left end, parameter is length.
Vertical line data: (x, y) location of top end, parameter is length.
Move data: (x, y) location of upper, left end, parameter is one of 8 directions for $2^{nd}$ pixel.
Bitmap data: Correction information is too big, or bitmap is too discombobulated, just put in a bitmap at the right size.

Move data refers to two (2) pixels together. Table 2 illustrates various types of move data, where "@" is a first pixel and "*" is a second pixel.

TABLE 2

Type 1) @*
Type 2) @
        *
Type 3)  @
        *
Type 4) @
         *

Bitmap data stores the final image. In addition, the correction information may be capable of being characterized in at least two ways. As such, the appropriate way to characterize the information may be selected based on a size of the information. For example, using four (4) point data lined up in a horizontal line requires more storage space than using one horizontal line data of length four (4). The present invention may correct the mistake and save the optimally sized arrangement of correction information. This is thus used to save additional space in the data.

To create a font, the various types of data of Table 1 may be combined for each character, or glyph, at each size that requires correction. Typically, a document requires no more than four (4) "small-size" font heights, so the data for these sizes is stored in the outline font file. Larger sizes generally do not require such information. Typically, an amount of the information may be a function of a size of the characters.

The present method thus provides hinting for outline fonts at a small number of sizes to create a very small, high quality font. This is accomplished by saving a group of corrections to be applied to a character when it is viewed at a given smaller size. By doing so, the amount of data required to be stored may be reduced while maintaining a high-quality, scalable font.

More information regarding an exemplary font outline compression scheme will now be set forth.

Figure 2:
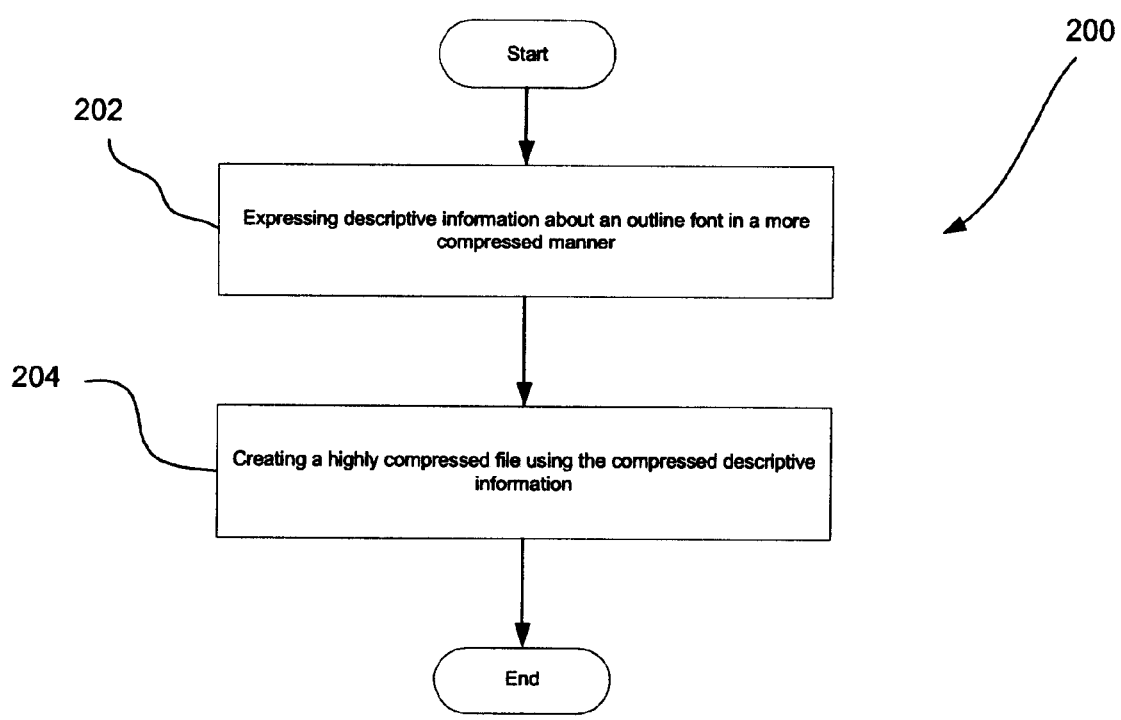
FIG. 2 is a flowchart illustrating a two-stage method for compressing characters, in accordance with an exemplary embodiment.

FIG. 2 is flowchart illustrating a two-stage method 200 for compressing characters. A first stage 202 includes a process of taking information about an outline font and expressing this information in a more compact and efficient manner. This is accomplished using mathematical primitives. The compression may be lossy. In other words, the outline defined by the compressed description may be slightly different than the original outline. As an option, this difference is a tunable parameter is the process. One can select a better approximation, with the result that the compression ratio is reduced. Alternatively, the degree to which the compressed outline approximates the original outline can be reduced, and as a result the compression is improved (the size of the compressed data file will be reduced).

Figure 3:
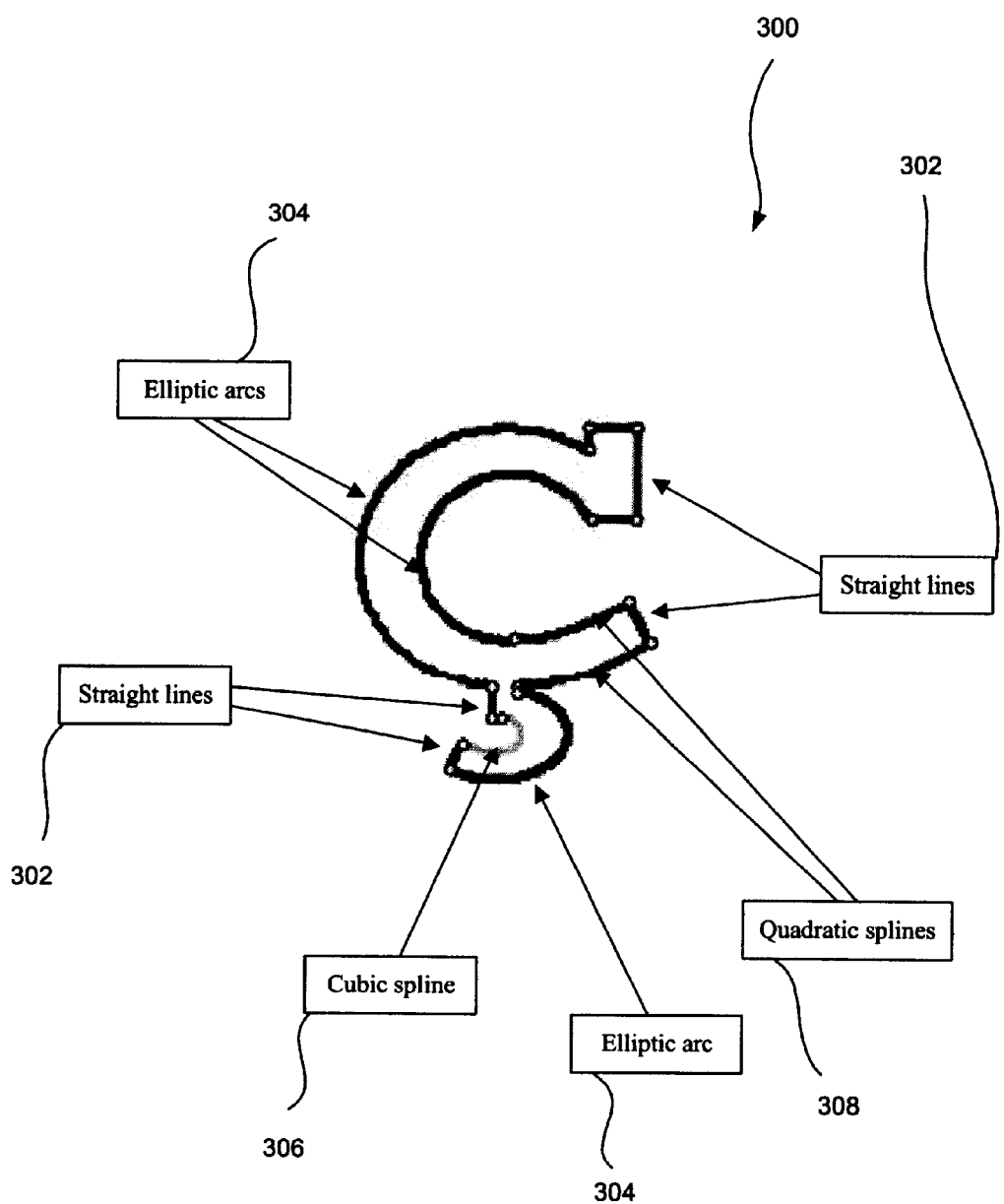
FIG. 3 illustrates an example of an outline that may be described as a sequence of mathematical primitives.

FIG. 3 illustrates an example of an outline 300 that may be described as a sequence of mathematical primitives. As shown, such an outline 300 may be described to include straight lines 302, elliptical arcs 304, cubic splines 306, quadratic splines 308, etc.

With continuing reference to FIG. 2, a second stage 204 of the method 200 of compression includes a process of taking the compressed mathematical description of the glyphs mentioned above and creating a highly compressed binary file according to certain procedures.

Figure 4:
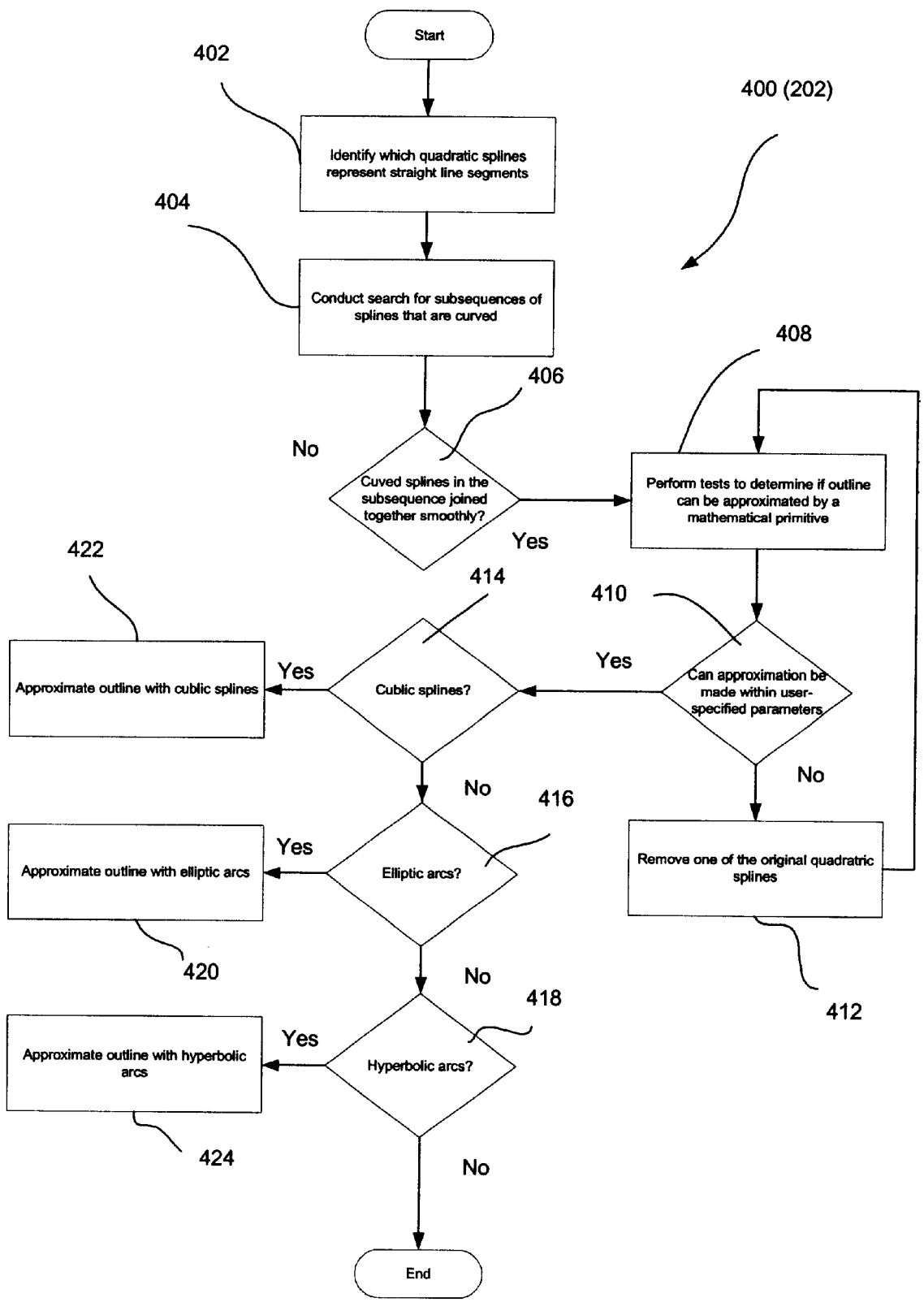
FIG. 4 illustrates a more detailed description of the first stage of the method of FIG. 2.

FIG. 4 illustrates a more detailed description 400 of the first stage 202 of the method 200 of FIG. 2. Before the process begins, outline data about a set of glyphs is collected. This could be TrueType or other types of data. Such outline data may also include a set of points drawn around the outline of a glyph. For the purposes of the present discussion, TrueType data will be assumed to be used, i.e. a sequence of quadratic splines that defines the outlines of the glyphs.

Initially, in operation 402, the quadratic splines that represent straight-line segments are first identified. This can be accomplished using a test involving a vector cross product by carrying out two multiplications and five subtractions. The idea is to reduce the problem to that of computing a vector cross product of two vectors in a two-dimensional space. Thus, it is first necessary to calculate the two components of each of the two vectors involved. This is accomplished by subtracting the initial point from the final point. Therefore, a total of four subtractions are involved in determining the components of the two vectors. Next, the cross product is calculated using two multiplications and a further subtraction. This is the natural extension of the idea of a cross product to a two-dimensional space. The cross product is ordinarily used to combine two vectors in a three-dimensional space to obtain another vector in the three-dimensional space. In the present context, two vectors in a two-dimensional space are combined to obtain a single number. Such a number represents the signed area of the parallelogram defined by the two vectors. Thus, this number can be used to test if the two vectors are parallel or not. If they are parallel, the resulting area will be zero. If the area is not zero, the vectors are not parallel, and the spline is not a straight line. As will become apparent later, straight-line segments are handled separately with respect to the remaining segments.

Next, in operation 404, a search is carried out for subsequences of splines that are all curved. Such search is conducted for the set of splines that constitute a given closed curve.

It should be noted that subsequences of maximal length are identified first. For each subsequence, a test is carried out to determine if the splines in the subsequence join together smoothly. Note decision 406. In other words, it is determined whether that the tangent vectors of two splines are parallel at the point where they join together.

Having identified such a smooth subsequence of curves, various tests are carried out in operation 408. Such tests are performed to determine if the present part of the outline can be approximated well by a mathematical primitive. Note decision 410.

Table 3 illustrates the various mathematical primitives that may be employed.

TABLE 3 cubic splines (414)
elliptic arcs (416)
hyperbolic arcs (418)

If the fit of any of these curves is acceptable according to a cut-off parameter that can be adjusted by the user (tunable), such part of the outline is stored as this mathematical curve in the manner that will soon become apparent. If none of the mathematical curves fits well enough, one of the original quadratic splines is removed from the subsequence in operation 412, and the procedure is repeated with the remaining set of splines.

Some of the details of how the mathematical curves in Table 1 may be implemented will now be set forth.

Elliptical Arc (420)

In general, an elliptic arc is specified by seven numbers. These may be thought of as two coordinates for one endpoint, two coordinates for the other endpoint, and three parameters that determine the shape of the arc. One possible formulation for these three parameters will now be set forth.

The present choice of parameters involves dimensionless numbers that do not depend on the overall size of the glyph. First, the center of a circle is defined by specifying its location along the perpendicular bisector of the two on-curve points mentioned above (the endpoints). This distance along the perpendicular bisector is specified in units of the distance between the two points, so the specification involves a dimensionless parameter. This parameter can be positive, negative or zero.

At this point, a circular arc is defined by requiring it to pass through the two on-curve points and also have the specified center. Next, a linear transformation is applied that causes a stretching in the direction perpendicular to the line connecting the two on-curve points. Again, a dimensionless parameter is involved in the definition of this transformation.

Thereafter, a linear transformation is applied that is a shear along the direction defined by the two on-curve points. This involves a third dimensionless parameter.

Finally, one bit of information (a zero or a one) is included to specify the side of the original line segment (the line segment connecting the two on-curve points) on which the elliptic arc lays. The reason that this bit is necessary is that the points along the outline are in a sequence. As such, the possibility of introducing a convention that the arcs lie always on the left side of the ray starting at the first on-curve point and having a direction defined by the second on-curve point is not possible. Such a convention would be possible if, for example, a free-floating elliptic arc were being defined. Then, the order in which the two on-curve points were presented could be used as part of a convention for determining the side on which the elliptic arc were located.

In summary, the overall position and rotational orientation of the arc is determined by the two on-curve points, and the exact type of elliptical arc is determined by the three dimensionless parameters and the single additional bit of information.

The process of fitting an elliptic arc to a set of data points involves minimizing a real-valued function of three variables. These variables may be the three dimensionless parameters mentioned above. Minimizing a function of three variables requires a considerable amount of CPU time, so it is desirable to reduce the problem to that of minimizing a function of two variables.

This may be accomplished by imposing a constraint on the three parameters. One constraint is that the family of ellipses under consideration has the same maximum lateral extent from the line between the two on-curve points as the original font data. With this constraint imposed, the problem reduces to that of minimizing a function of two variables.

This is carried out using a variety of different starting points for the minimizing algorithm, and the results are compared with certain limits on the parameters. It is desirable to avoid elliptic arcs that display extreme behavior or whose curvature is too severe at the turning points. The limits may be set by the user in advance. If the elliptic arc does not satisfy the conditions imposed by these limits, it is rejected. Subsequently, the other mathematical primitives become the remaining candidates.

It should be noted that the data that is used to describe an elliptic arc can be expressed in different equivalent forms. The form described above involves the specification of four coordinates to determine the two on-curve points, while the exact type of elliptical arc is determined by the three dimensionless parameters and the single additional bit of information.

One alternative may include thinking of the additional bit as a sign bit for the first linear transformation parameter, thus combining these into a single signed parameter. The reason it is useful to keep these separate, however, involves the manner in which the process optimizes the elliptical fit. The sign bit is determined early in the procedure, and then the minimization process involves a stretching parameter that is always positive. In contrast, the second linear transformation (also discussed above) involves a shear parameter that is treated as a signed quantity throughout the process.

Cubic Spline (422)

The process of fitting a cubic spline to a set of data points may, in principle, involve minimizing a function of four variables, the position coordinates of the two control points. In practice, this requires a great deal of CPU time, so the following alternative method has been developed.

The location of the two control points may be reduced to a two-dimensional problem by requiring that the points lie on lines determined by certain conditions on their slopes. These conditions may dictate that the direction of the line from the first endpoint to the first control point be the same as the direction of the line from the first endpoint to the control point of the first spline in the subsequence of splines that is being considered. A similar constraint may be imposed on the other control point relative to the last endpoint.

The two degrees of freedom remaining are the location of the control points along the lines just defined. Having reduced the problem to that involving the minimization of a real-valued function of two variables, the process becomes fairly rapid and can be carried out by a simple method of locating global minima.

Depending on the font under consideration, it may be advantageous to rule out the use of one of the mathematical primitives. For example, it has proven to be useful to eliminate the hyperbola from consideration when compressing certain Latin and ideographic fonts. This reduction in the number of primitives makes it possible to reduce the amount of overhead in the compressed data file, and furthermore it makes for a more compact rasterizer because the rasterizer does not have to support the rendering of the additional primitive.

Hyperbolic Arcs (424)

It should be noted that approximation by hyperbolic arcs may be accomplished utilizing any desired manner. For example, a method that accomplishes the task is to begin with a symmetric hyperbola that passes through the two endpoints that are given. The vertical extent is determined by the maximum vertical extent of the data points, as in the case of the ellipse. The only remaining parameter at this stage is a parameter that is analogous to the radius of a circle, when carrying out the corresponding process for an elliptic arc. This parameter is a measure for how sharp the hyperbola is at the upper point (the point with the same lateral extent as the data set). Next, a linear transformation that effects a stretch in the vertical direction is implemented. This involves an additional parameter, which may be taken to be positive Finally, a linear transformation that effects a shearing is applied. In total, three parameters are involved. The idea of matching the lateral extent of the data points can be used to reduce this to two parameters, which results in a faster search for the optimum parameters.

Alternatives

Other techniques for optimizing the compression will now be set forth. To improve the appearance of the glyphs generated from the compressed data, it is often useful to impose certain constraints on the way in which the mathematical primitives join together. Some of these constraints involve how ellipses join with other types of primitives.

For example, it may be desirable to forbid elliptic arcs to join with straight-line segments if their directions are similar but not exactly the same. Such a situation could occur near the top of a capital B, for example. Another constraint that could be imposed includes a condition on the direction of an elliptical arc and a cubic spline at the point where they join together, if their directions are similar at that point.

Figure 5:
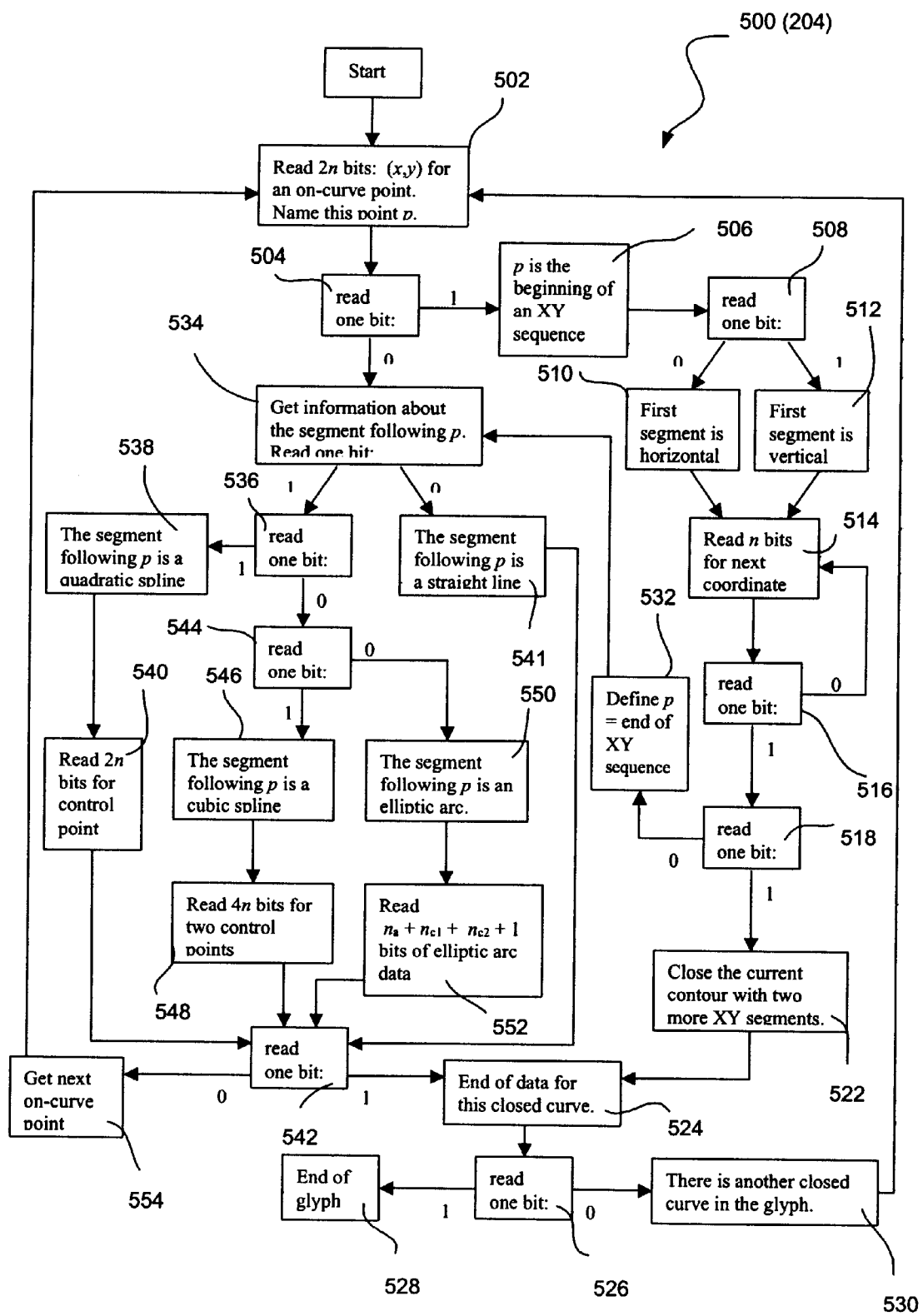
FIG. 5 is a flowchart illustrating the manner in which the second stage of the method of FIG. 2 operates, in accordance with one embodiment of the present invention.

FIG. 5 is a flowchart illustrating the manner 500 in which the second stage 204 of the method 200 of FIG. 2 operates, in accordance with one embodiment of the present invention. The second stage of the compression method 200 is the process of taking the compressed mathematical description of the glyphs described above and creating a highly compressed binary file. This process involves several tunable parameters.

Such tunable parameters may include the number of bits that are used to store position coordinates (see n in FIG. 5) and the number of bits that are used to store the ellipse parameters (see $n_a$, $n_{c1}$ and $n_{c2}$ in FIG. 2).

Another important concept includes that of an XY sequence. An XY sequence is a sequence of straight-line segments in an outline, with the property that they have alternately horizontal and vertical components. An example of an XY sequence is visible in the upper right portion of the character of FIG. 3.

A great savings in space can be accomplished by identifying such XY sequences because only one position coordinate must be specified per segment. Thus, even a single horizontal or vertical segment may be treated in this way because it saves the specification of a position coordinate.

Furthermore, it is important to appreciate the subtleties that are involved when an entire closed curve consists of horizontal and vertical segments. Examples include a simple rectangle, but also more complicated objects, such as a capital E. When proceeding around such an outline, all of the necessary data has been processed when there are still two segments remaining, because their locations are completely determined at that stage. Thus, this case must be treated separately, as shown in FIG. 5.

As shown in FIG. 5, 2n bits (x,y) are read for an on-curve point p in operation 502. Thereafter, in operation 504, one bit is read. If such bit is "1", p is marked as the beginning of an XY sequence in operation 506. Once this happens, one bit is read in operation 508, and if "1", the first segment is determined to be horizontal in operation 510. On the other hand, if the bit read is "0", the first segment is determined to be vertical in operation 512.

Next, in operation 514, n bits are read for the next coordinate. This is continued, bit-by-bit, in operation 516 until a "1" is encountered in operation 518. Thereafter, if another "1" is read in operation 518, the current contour is closed with two more XY segments in operation 522, and it is determined that the end of the data has been encountered for the current closed curve. Note operation 524.

Another bit is read in operation 526. If a "1" is encountered, the glyph (or character) is determined to be ended in operation 528. On the other hand, if a "0" is encountered, it is determined that there is another closed curve in the glyph in operation 530. Operation then continues in operation 502.

Returning to operation 518, if it is determined that a "0" is read, p is defined as the end of the current XY sequence in operation 532, and the current process is continued in operation 534. In operation 534, information regarding the segment following p is gathered by reading a single bit. If a "0" is encountered, the segment following p is considered a straight line (note operation 541), a majority of the present procedure is skipped, and a bit is read in operation 542.

If, however, a "1" is encountered, another bit is read in operation 536. If, in operation 536, a "1" is encountered, the segment followings is determined to be a quadratic spline in operation 538, and 2n bits are read for a control point in operation 540. Thereafter, a bit is read in operation 542 for reasons that will soon become apparent.

Returning to operation 536, if a "0" is encountered, another bit is read in operation 544. If a "1" is encountered in operation 544, the segment following p is considered a cubic spline in operation 546, and 4n bits are used to determine two control points in operation 548. If a "0" is encountered in operation 544, the segment following p is considered an elliptical arc in operation 550, and $n_a+n_{c1}+n_{c2}+1$ bits are read to define the elliptical arc in operation 552.

In operation 542, a bit is read. If a "1" is encountered, it is determined that the end of the data is encountered for the closed curve in operation 524. On the other hand, then next on-curve point is retrieved in operation 554, and the operation 502 is repeated.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for compression of characters with a predetermined size, comprising:
    (a) receiving a plurality of characters;
    (b) compressing the characters;
    (c) determining if a size of the characters meets a predetermined criteria;
    (d) storing additional information with the compression if the size of the characters is determined to meet the predetermined criteria; and
    (e) selecting the way to characterize the information based on a size of the information;
    (f) wherein an outline of the characters are compressed;
    (g) wherein the information includes correction information;
    (h) wherein the correction information is capable of being used to correct the characters upon being displayed with the predetermined size;
    (i) wherein the information includes position data, type data, and parameters data;
    (j) wherein the information includes point data, horizontal line data, vertical line data, move data, and bit map data;
    (k) wherein the information stored with the compression includes bit map data at a predetermined character size;
    (l) wherein the information is capable of being characterized using at least two ways;
    (m) wherein an amount of the information is a function of a size of the characters;
    (n) wherein the size includes a font size;
    (o) wherein the information modifies the characters for increasing the accuracy of the characters;
    (p) wherein re-occurring information is used to modify an initial character upon occurrence of a special case;
    (q) wherein bit map data is selected instead of correction information based on relative sizes of the bit map data and correction information.

2. A computer program product for compression of characters with a predetermined size, comprising:
    (a) computer code for receiving a plurality of characters;
    (b) computer code for compressing the characters; and
    (c) computer code for storing information with the compression, wherein the information is capable of being used to modify the characters upon the characters being displayed with a predetermined size;
    (d) wherein the information includes bit map data and correction information;
    (e) wherein bit map data is selected instead of correction information based on relative sizes of the bit map data and correction information.

3. The computer program product as recited in claim 2, wherein the correction information is capable of being used to correct the characters upon being displayed with the predetermined size.

4. The computer program product as recited in claim 2, wherein the information includes position data, type data, and parameters data.

5. The computer program product as recited in claim 2, wherein the information includes point data, horizontal line data, vertical line data, and move data.

6. The computer program product as recited in claim 2, wherein an amount of the information is a function of a size of the characters.

7. The computer program product as recited in claim 2, wherein the size includes a font size.

8. The computer program product as recited in claim 2, wherein the information is created manually.

9. The computer program product as recited in claim 2, wherein the information is created automatically.

10. A method for compression of characters with a predetermined size, comprising:
    (a) receiving a plurality of characters;
    (b) compressing the characters; and
    (c) storing information with the compression, wherein the information is capable of being used to modify the characters upon the characters being displayed with a predetermined size;

(d) wherein the information includes bit map data and correction information;

(e) wherein bit map data is selected instead of correction information based on relative sizes of the bit map data and correction information.

11. The method as recited in claim 10, wherein the correction information is capable of being used to correct the characters upon being displayed with the predetermined size.

12. The method as recited in claim 10, wherein the information includes position data, type data, and parameters data.

13. The method as recited in claim 10, wherein the information includes point data, horizontal line data, vertical line data, and move data.

14. The method as recited in claim 10, wherein an amount of the information is a function of a size of the characters.

15. The method as recited in claim 10, wherein the size includes a font size.

16. The method as recited in claim 10, wherein the information is created manually.

17. The method as recited in claim 10, wherein the information is created automatically.

* * * * *